May 4, 1954   R. C. MACHLER   2,677,277
RADIATION METHOD AND APPARATUS FOR MEASURING THE
TEMPERATURE OF A HEATED BODY WITHIN AN ENCLOSURE
Filed Feb. 6, 1951   2 Sheets-Sheet 2
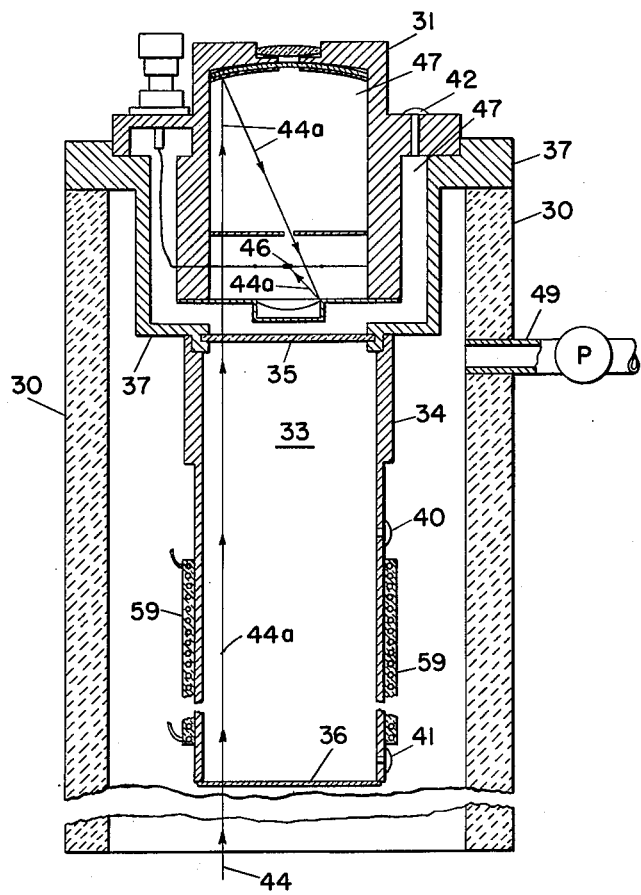
Fig.2
Fig.3
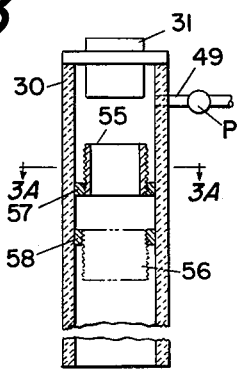
Fig.3A
INVENTOR.
RAYMOND C. MACHLER
BY
Woodcock and Phelan
ATTORNEYS Patented May 4, 1954

2,677,277

UNITED STATES PATENT OFFICE 2,677,277

RADIATION METHOD AND APPARATUS FOR MEASURING THE TEMPERATURE OF A HEATED BODY WITHIN AN ENCLOSURE

Raymond C. Machler, Philadelphia, Pa., assignor to Leeds and Northrup Company, Philadelphia, Pa., a corporation of Pennsylvania Application February 6, 1951, Serial No. 209,662

22 Claims. (Cl. 73—355)

This invention relates to methods of and apparatus for measuring the temperature of a heated body within an enclosure and has for an object the provision of a temperature measuring system of high accuracy and one whose accuracy is substantially independent of the concentration and temperature of the atmosphere surrounding the body whose temperature is to be measured.

This invention is particularly applicable for measuring the temperature of a heated body within a controlled atmosphere furnace. As is common practice in connection with temperature measurements in controlled atmosphere furnaces, for example, furnaces of the type disclosed in United States Patent No. 2,168,028, Harsch, a thermocouple or other temperature-sensitive device may extend up through the bottom of the furnace and project into the work chamber. While the thermocouple will give an accurate indication of the temperature of the gases surrounding it, this temperature will not necessarily be the temperature of the work unless the thermocouple is in contact with the work, or unless the work has been in the furnace for a sufficiently long time to bring the work and the work chamber to a uniform temperature. Accordingly, a preferred method for measuring the temperature of the hot body within the furnace is to sight a radiation pyrometer, through an opening in a wall of the furnace, on the heated body or work and measure the temperature of the work as a function of the radiation received by the radiation pyrometer.

As is well known, conventional radiation pyrometers are sensitive to changes in concentration and temperature of gases and vapors in the atmospheric path between the target sighted and the pyrometer when such gases and vapors absorb substantially different amounts of radiant energy. Various methods have heretofore been devised to compensate for errors in temperature measurement due to atmospheric absorption. For example, in United States Patent No. 2,275,265, Mead, the path of radiation from the work surface under observation to the radiation pyrometer was maintained free of smoke and flame or other media which would otherwise cause the output voltage of the radiation pyrometer unpredictably to vary to magnitudes lower or higher than the voltage corresponding with the work temperature, by forcing air, or other suitable fluid medium, downwardly through the pyrometer sighting tube. Other methods for eliminating the absorption error in temperature measurement include the differential method and the isothermal cavity method, both as disclosed in my copending application, Serial No. 142,886, filed February 7, 1950. The latter two methods are more applicable to temperature measurements made outside of a furnace as the apparatus is somewhat elaborate and it is necessary to bring the apparatus into a position closely adjacent the body whose temperature is to be measured.

In accordance with the present invention, the temperature of the heated body within a furnace may be measured by means of a radiation-responsive detector, for example, a radiation pyrometer, in avoidance of errors caused by absorption of thermal radiation in the gases and vapors surrounding the body whose temperature is to be measured and without providing compensation for radiation absorption in the pyrometer calibration. More specifically, there is provided a system for reducing errors in temperature measurement caused by selective absorption of thermal radiation by gases and vapors existing in the atmospheric path between a radiation pyrometer and the body whose temperature is to be measured, comprising a radiation pyrometer for receiving radiation from the body from which radiation is emitted and a filter cell interposed in the optical path between the body and the pyrometer. The radiation-transparent filter cell contains a gaseous medium or media having substantially the same radiation absorbing characteristics as the gases and vapors existing in the atmospheric path between the body and the filter cell.

For a more detailed disclosure of the invention and for further objects and advantages thereof, reference is to be had to the following description taken in conjunction with the accompanying drawings, in which:

Fig. 2 is a diagrammatic section on the axis of the apparatus on an enlarged scale;

Fig. 3 is a diagrammatic view of another modification of the invention; and

Fig. 3A is a sectional view taken along lines 3A—3A of Fig. 3.

Figure 1:
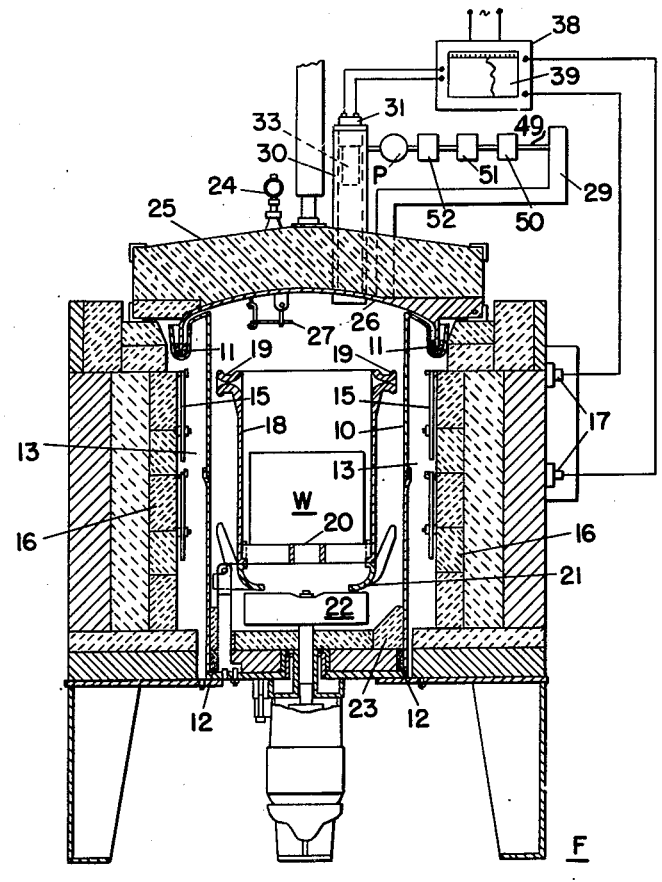
Fig. 1 is an elevational view showing the present invention as applied to an atmosphere controlled furnace, the latter being shown mainly in section.

Referring to Fig. 1, the invention has been shown in connection with a furnace F of the controlled atmosphere type as disclosed in Harsch Patent No. 2,168,028. The interior of the furnace F is provided with a tubular retort member 10, the bottom end of which is supported on the bottom or baseplate of the furnace. The top and bottom ends of the retort 10 are provided with sealing structure 11 and 12 respectively whose purpose is to prevent leakage into the retort 10 from the heating chamber 13 or from outer atmosphere, and to prevent leakage from the retort 10 to the heating chamber 13 or to atmosphere. The space between the outside of the wall structure of the retort 10 and the inner face of the heating chamber 13 is heated in any suitable manner; in the particular arrangement shown in Fig. 1, the ribbons 15 of suitable resistance material, such as nickel-chromium alloy, are hung from the refractory blocks 16 lining the heating chamber 13 and suitably connected, as by conductors, not shown, to terminals 17 connected to a source of electric current.

For supporting the work W or heated body within the retort 10, and to facilitate loading and unloading, there is preferably provided a removable work basket 18 having lifting ears or lugs 19 at the upper end thereof and provided at the bottom with a grid or grating 20 which supports the work. The lower end of the work basket 18 is supported by a member 21, the central portion of which is open and shaped to provide a duct from the outside of the work basket 18 to the fan 22 in the base of the retort 10. Resting upon the bottom of the furnace there are provided air-deflector bricks 23 which are suitably curved to direct the atmosphere circulated within the retort 10 by the fan 22 toward or from the fan depending upon the direction of circulation. Preferably, the direction of circulation is such that the atmosphere in the retort path is downwardly through the work basket 18 to the fan 22 and then upwardly around the work basket to the top of the retort.

For carburizing the load or work W in the work basket 18, a suitable carburizing agent, for example, fusel oil, dipentene, butane, methane, or natural gas, is fed, preferably at a metered rate, by means of an inlet member 24 extending through the cover 25 into the upper region of the reaction or treating chamber defined by the retort 10, the cover member 26 and the seal construction 11. The carburizing agent, for example, methane, when introduced into the furnace in liquid phase is vaporized in the region immediately adjacent the top of the work basket 18, and the vaporized liquid is immediately brought into contact with the load in the work basket.

To prevent impingement of unvaporized carburizing agent upon the top of the load when the agent is introduced into the furnace in liquid or vapor phase, there is provided a fluid target or vaporizing plate 27 supported directly below the inlet member 24. As the vaporizing plate 27 is located within the retort 10, during operation of the furnace the plate 27 will be at a high temperature sufficient immediately to vaporize any of the carburizing agent which reaches it in liquid form. The vaporizing agent is immediately entrained by the circulating atmosphere and passes therewith downwardly into contact with the work W to effect carburization thereof.

An exhaust pipe 29 extends through the cover 25 of the furnace F and provides for continuous discharge of the exhausted treating gases.

Also extending through the cover 25 of the furnace F and in alignment with the interior of the work basket 18, is a supporting member or tube 30 for supporting a radiation pyrometer 31, preferably of the multi-couple type disclosed in United States Patent No. 2,232,594, Dike, or of the type described and claimed in application Serial No. 139,308, filed January 18, 1950, by William G. Fastie, a co-employee of mine, now United States Patent No. 2,601,508, for producing an electromotive force representative of the quantity of radiation received by the radiation pyrometer.

The carburizing atmosphere within the retort 10 of the furnace F absorbs selectively from the black-body radiation from the work W, i. e., it absorbs radiant energy of selected lines or bands of the spectrum, thus producing errors in temperature measurement when such measurements are made with a conventional radiation pyrometer. For example, with a carburizing agent of methane, temperature measuring errors in the order of 90° F. have occurred in measurements taken with conventional radiation pyrometers. Such errors in measurement may be eliminated or materially reduced by rendering the conventional radiation pyrometers insensitive to changes in concentration and temperature of the infra-red radiation-absorbing gases and vapors in the atmospheric path between the target sighted and the pyrometer.

In accordance with the present invention, for rendering the radiation pyrometer 31 insensitive to the infra-red radiation-absorbing atmosphere within the furnace F, there is provided a filter cell 33 supported within the supporting tube 30 and adjacent the lower end of the radiation pyrometer 31. The filter cell 33 is filled with a medium having substantially the same radiation-absorbing characteristics as the atmosphere within the furnace surrounding the work or heated body W. As the filter cell 33 is disposed in the optical path between the radiation pyrometer 31 and the work W, the radiant energy emitted by the gases and vapors surrounding the work W will be absorbed by the medium within the filter cell and substantially only the radiation emanating from the work W in the spectral regions not influenced by the atmosphere will be received by the radiation pyrometer 31. In effect, considering the optical or radiation path from the work to the pyrometer, the constant absorption characteristic of the gas in the cell effectively swamps or overrides the variations in the absorption of the gaseous atmosphere in the furnace.

Referring to Fig. 2, the filter cell 33 has been shown in the form of a tubular member or housing 34, the ends of which are provided with fused quartz radiation-transparent windows 35 and 36. The filter cell 33 may be mounted directly on the lower end of the housing 37 of the radiation pyrometer 31 or, if preferred, may form a separate unit (Fig. 3). Also, if the filter cell is sealed to the pyrometer housing, the upper window 35 may be omitted and the filter gas admitted directly to the interior of the pyrometer housing. The housing 34 of the filter cell 33 preferably is provided with one or more ports 40, 41 through which the furnace gas, for example, methane ($CH_4$) is injected. The ports are then sealed and the gas or vapor is trapped within the interior of the filter cell. If the gas is to be admitted to the interior of the pyrometer housing 37, the port 42 may also be used, the pyrometer being hermetically sealed after admission of the gas.

As an alternative arrangement, the filter cell 33 may be provided with an inlet port and an outlet port which may be connected to the exhaust pipe 29 of furnace F. In this manner a continuous flow of the exhausting furnace gases may be directed through the interior of the filter cell 33, thus eliminating the necessity for sealing the gas ports. In this arrangement there should also be provided suitable means for cleaning, cooling and drying the gases after they are exhausted from the furnace and prior to their injection into the filter cell, as hereinafter to be described.

To provide the operator with an indication of the temperature of the work W, the pyrometer 31 may connect to any suitable voltage-responsive device or arrangement, for example, a voltmeter provided with a scale calibrated in units of temperature, or a measuring network such as a potentiometer having a rebalancing slidewire associated with a temperature scale. Preferably, and as shown in Fig. 1, the measuring instrument 38 is also a recorder, which may be of the type disclosed in United States Patent No. 1,935,732, to L. Y. Squibb, or United States Patent No. 2,113,164, to A. J. Williams, Jr., on whose chart or record sheet 39 there is traced the temperature of the work W within the furnace F.

The present invention is also applicable to controlling the temperature within the furnace F. In prior art control methods, the control thermocouple was located at the bottom of the furnace between the retort and the work or load, but not in such position as to bring the thermocouple into physical contact with the load. Such an arrangement is undesirable as the thermocouple does not indicate the load temperature, but instead indicates the temperature of the atmosphere at a location not in the load. Such a control system permits the upstream end of the work or load to overshoot the selected control temperature, thus introducing undesired strains in the load material. By sighting the radiation pyrometer directly on the work W, an accurate indication of the highest actual work temperature may be obtained, thus providing a more accurate control of the temperature of the work. Accordingly, the instrument 38 may also include a controller which, for example, may be of any of the types disclosed in United States Patents Nos. 2,300,537 or 2,325,232, Davis. Preferably, the controller may also be provided with a variable transformer as disclosed in my aforementioned copending application, which may be connected to the terminals 17 and in series with the heating ribbon 15 for varying the energization of the latter in accordance with variations of the temperature of the work W.

In one embodiment of the invention the supporting tube 30 comprised an open-end ceramic tube approximately fifteen inches in length with an inside diameter of approximately three inches. The tube was mounted in an opening in the furnace cover 25 and extended approximately nine inches into the interior of the furnace F. A radiation pyrometer was mounted on the upper end of this tube and a filter cell approximately six inches in length was attached to the front of the pyrometer in a manner similar to that shown in Fig. 2. A carburizing fluid, which on cracking generates methane, was introduced into the controlled atmosphere furnace. In measuring the temperature of the work W with the radiation pyrometer, but in the absence of the filter cell, it was found that the methane in the furnace atmosphere absorbed sufficient radiant energy in wavebands characteristic of methane to reduce the black-body radiation from the work W and arriving at the receiver of the radiation pyrometer to such an extent that an error of the order of 90° F. occurred in the temperature measurement. This error was occasioned by changing from zero to one hundred percent methane ($CH_4$) in the furnace atmosphere. By filling the filter cell with methane ($CH_4$) substantially at room temperature and placing it immediately before the radiation pyrometer, it was found that this error could be reduced by a factor of approximately five. While this substantial reduction in temperature measurement error was attained through the use of a filter cell containing a gas at room temperature, it is to be understood that a further reduction in the measurement error may be obtained by heating the gas within the filter cell, as by a resistance heater 59, to approximately the temperature of the work W in the furnace. The absorption bands of the gases vary in accordance with variation in gas temperature. Such band variation is in the nature of variation in the distribution and the width of the lines making up the band. Thus, by heating the gas in the filter cell to a temperature approximately equal to that of the work or heated body in the furnace, the filter cell will absorb in a manner more nearly like the furnace gas than will a relatively cold filter cell containing a gas at approximately room temperature. The current through the heater 59 may be varied for varying the temperature of the filter gas to correspond with different values of work temperature.

In view of the foregoing, it is possible by heating the gas in the filter to a temperature such that the radiant energy emitted by the gas is not sufficient to disturb the zero reading of the radiation pyrometer to provide a more effective filter capable of blocking additional and wider lines or bands of increased intensity than can be blocked by a cooler filter.

For purpose of explanation, ray 44, Fig. 2, may be taken as representative of the total radiation emitted by the work W and its surrounding gases and vapors within the furnace F. As the ray 44 passes through filter cell 33, the component of radiation comprising radiant energy in wavebands absorbed and emitted by the furnace gases and vapors will be absorbed, thus reducing the intensity of ray 44 to a ray of lower intensity, indicated at 44a comprising a single radiation component derived solely from the work W and substantially unaffected by the absorption and emission characteristics of the furnace gases and vapors. The ray 44a is directed into the radiation pyrometer 31 where it is received by a detector diagrammatically shown as a thermopile 46.

In another modification of the invention, two or more filter cells may be interposed in the optical path between the detector of the radiation pyrometer and the work sighted. For example, as shown in Fig. 2, a cell or chamber 47 may be provided in the housing 37 of the pyrometer 31, thus providing a second cell for use in combination with cell 33. By providing two or more cells, separate constituents comprising the furnace atmosphere may be placed in the cells. For example, if methane ($CH_4$) and carbon dioxide ($CO_2$) are both constituents of the furnace atmosphere during fluid flow, cell 33 may be filled with $CH_4$ and cell 47 may be filled with $CO_2$, thus using both gases as filtering gases.

As shown in Fig. 3, various combinations of filter cells may be utilized. For example, a filtering medium may be injected directly into housing of the pyrometer 31 and the pyrometer hermetically sealed. This unit may be used separately or it may be used in combination with additional filters, for example, cells 55 and/or 56. When separate filters are used with the pyrometer, they may be spaced at any distance from the pyrometer as long as they are positioned along the optical axis between the pyrometer and the work whose temperature is to be measured. The cells 55 and 56 have been shown as having threaded exterior surfaces which are adapted to be screwed to the internally threaded bosses 57, 58 located within the supporting tube 39. The bosses 57 preferably comprise a plurality of equally spaced projections, as shown in Fig. 3A. The bosses 58 may also be constructed in a similar manner. Thus, there is provided a continuous flow passage through the supporting tube 39, thereby permitting the conditioned exhaust gases from the furnace to pass over the windows of the various cells as hereinafter to be described.

As may be seen in Fig. 1, pyrometer 31 and cell 33 need not be removed when the load is taken out of the furnace F and a new load placed therein, thus providing a more or less permanent installation. The open-end supporting tube 39 extends into the furnace F and the furnace atmosphere comes into direct contact with the lower window 36 of filter cell 33, Fig. 2. Such an arrangement tends to permit the formation of soot deposits on filter cell window 36, thereby introducing an additional source of error in temperature measurement. Accordingly, to prevent such soot depositions an atmosphere flow may be directed into the supporting tube 39 and past the filter window 36. While heretofore pyrometer mounting tubes, when used with an ordinary combustion chamber, have often been purged with air to keep them clear of smoke and dust, in the case of controlled atmosphere furnaces, for example, of the type disclosed herein, it is often imperative that no foreign gases be injected into the heat-treating chamber of the furnace. In accordance with the present invention, provision is made such that the furnace atmosphere (gases) may be used for the purging operation, thus eliminating any need for introducing a new gas into the controlled atmosphere. By purging with conditioned furnace atmosphere it is assured that the absorption characteristic in the atmosphere in the optical path of the pyrometer remains the same. There is also avoided the possibility of creating explosive mixtures by the introduction of foreign gas into the furnace. As shown in Fig. 1, the furnace gas may be tapped out of the exhaust line 29 and into a connecting flow passage such as tubular member 49. To condition the gas, it is passed through a suitable filter, heat exchanger and drier, examples of which are well known to those skilled in the art and have been indicated respectively by rectangles 50, 51 and 52, where the furnace gas is cooled to approximately room temperature and freed of solid carbon and condensable vapors such as water, after which the conditioned gas is injected by means of a pump P into the supporting tube 30 where it passes over the window 36 (Fig. 2) of the filter cell 33 and returns to the controlled atmosphere in the retort 10 in furnace F.

As previously mentioned for an alternative filter arangement, port 40 of filter cell 33 may be utilized as an inlet port having a flow connection to flow passage 49. As the exhausting furnace gas derived from flow passage 49 has previously been cleaned, cooled and dried by the carbon filter 50, heat exchanger 51, and drier 52, a portion of it may be directed into filter cell 33 through port 40 with the remainder being utilized for the purging operation. In this manner a continuous flow of the conditioned furnace exhaust gas may be directed through the interior of the filter cell 33 and out through port 41, thus eliminating the necessity for sealing the gas ports after the gas has been injected into the cell.

While preferred embodiments of this invention have been illustrated, it is to be understood that other modifications thereof may be made within the scope of the appended claims.

What is claimed is:

1. A system for reducing errors in temperature measurement caused by absorption of thermal radiation in gases and vapors existing in the atmospheric path between a radiation pyrometer and the body whose temperature is to be measured, comprising a radiation pyrometer for receiving radiation from a body from which radiation is emitted, and a radiation transparent filter cell interposed in the optical path between said body and said pyrometer, said filter cell containing a gaseous medium having substantially the same radiation-absorbing characteristics as the gases and vapors existing in the atmospheric path between said body and said filter cell for substantially eliminating radiant energy in the spectral bands absorbed by said filter cell from that received by said radiation pyrometer.

2. An apparatus for measuring the temperature of a heated body within the confines of a controlled atmospheric furnace comprising a radiation pyrometer for viewing through an aperture in the furnace a heated body therein, a radiation transparent filter cell containing a gaseous medium having substantially the same radiation-absorbing characteristics as the atmosphere within the furnace surrounding the body whose temperature is to be measured, and means for supporting said filter cell in the optical path between said radiation pyrometer and the body whose temperature is to be measured.

3. An apparatus for measuring the temperature of a heated body within the enclosure of a controlled atmospheric furnace comprising an open-end tube being adapted for extending through an opening in a furnace, a radiation pyrometer mounted at the outer end of said tube for sighting within the furnace the body whose temperature is to be measured, and a radiation transparent filter cell mounted within said tube in the optical path between said radiation pyrometer and said body, said filter cell containing a gaseous medium having substantially the same radiation-absorbing characteristics as the atmosphere surrounding said heated body within the furnace.

4. An apparatus for measuring the temperature of a heated body within the enclosure of a controlled atmospheric furnace comprising an open-end tube being adapted for extending through an opening in a furnace, a radiation pyrometer mounted at the outer end of said tube for sighting within the furnace the body whose temperature is to be measured, a radiation transparent filter cell mounted within said tube in the optical path between said radiation pyrometer and said body, said filter cell containing a gaseous medium having substantially the same radiation-absorbing characteristics as the atmosphere surrounding said heated body within the furnace, and means for circulating cooled atmosphere from said furnace through said pyrometer sighting tube for preventing the deposition of soot on said filter cell within said tube and in avoidance of varying the constituents of the controlled atmosphere within the furnace and the radiation-absorbing characteristics of the atmosphere in said optical path.

5. A system for reducing errors in temperature measurement caused by absorption of thermal radiation in gases and vapors existing in the atmospheric path between a radiation-responsive detector and the body whose temperature is to be measured, comprising a radiation-responsive detector for receiving radiation from the body whose temperature is to be measured, radiation-filtering means comprising a chamber containing a gas interposed in the optical path between said body and said detector, said chamber being radiation-transparent along its optical axis, said gas of said filtering means having substantially the same thermal radiation-absorbing characteristics as the gases and vapors existing in the atmospheric path between said body and said filtering means yet permitting the remainder of the radiation derived from said body to pass therethrough to said detector, and means for measuring the temperature of said body as a function of the radiation received by said detector.

6. The method of preventing the deposition of carbon particles in the optical path between a radiation pyrometer and work sighted within a controlled atmosphere furnace without introducing a foreign atmosphere into said furnace, comprising diverting a portion of the exhausting furnace atmosphere, cooling said diverted portion and freeing it of solid carbon and condensable vapors to condition said atmosphere, and directing said conditioned atmosphere into the optical path between said work and said pyrometer at a location adjacent the latter for reentrance of said conditioned atmosphere into said controlled atmosphere furnace in avoidance of varying the radiation-absorbing characteristics of the atmosphere in said optical path between the radiation pyrometer and the work sighted.

7. Apparatus for preventing the deposition of carbon particles in the optical path between a radiation pyrometer and work sighted within a controlled atmosphere furnace and avoiding varying the radiation-absorbing characteristics of the atmosphere in said optical path between the radiation pyrometer and the work sighted, comprising a radiation pyrometer, means for mounting said pyrometer for sighting work within the furnace, said mounting means and pyrometer forming an enclosure with respect to an opening in said furnace, a flow passage connected between the exhaust line of said furnace and said pyrometer mounting means, a pump connected in said flow passage for diverting a portion of the exhausting furnace atmosphere from said exhaust line into said flow passage, a heat exchanger connected in said flow passage for cooling said diverted furnace atmosphere, and means for freeing said atmosphere of solid carbon and condensable vapors to condition said atmosphere, said pump being adapted to force said cooled and conditioned furnace atmosphere into said pyrometer mounting means to provide a flow thereof past said radiation pyrometer and along the optical path between the latter and the work sighted.

8. For use with a radiation-responsive detector to measure the temperature of a body surrounded by an atmosphere which selectively absorbs and emits radiant energy, the combination which comprises a selective gaseous filtering means having radiation absorption characteristics substantially the same as the atmosphere surrounding said body, and mounting structure for supporting said filtering means in the optical path between said body and the radiation-responsive detector.

9. The combination set forth in claim 8 wherein said filtering means comprises a sealed radiation-transparent filter chamber containing an atmosphere having radiation absorption characteristics substantially the same as the atmosphere surrounding said body whose temperature is to be measured.

10. For use with a radiation-responsive detector to measure the temperature of a body surrounded by an atmosphere which selectively absorbs and emits radiant energy, the combination which comprises a selective gaseous filtering means having radiation absorption characteristics substantially the same as the atmosphere surrounding said body, said filtering means having at least one radiation-transparent window, mounting structure for supporting said filtering means in the optical path between said body and the radiation-responsive detector, and means connected to said mounting structure for directing a cleaning atmosphere against said window to prevent the deposition of soot upon said window said cleaning atmosphere having substantially the same radiation-absorbing characteristics as the atmosphere surrounding said body and in the optical path between said body and said radiation-responsive detector in avoidance of varying the radiation-absorbing characteristics in said optical path which would introduce errors in temperature measurements.

11. The combination as set forth in claim 10 wherein said filtering means comprises a sealed radiation-transparent filter chamber containing gas having radiation absorption characteristics substantially the same as the atmosphere surrounding said body whose temperature is to be measured.

12. An apparatus for measuring the temperature of a heated body within the enclosure of a controlled atmosphere furnace, comprising a radiation pyrometer for sighting on said body within the furnace, said pyrometer including a housing having hermetically sealed therein a gaseous filtering medium having substantially the same radiation-absorbing characteristics as the atmosphere surrounding said heated body within the furnace.

13. An apparatus for measuring the temperature of a heated body within the enclosure of a controlled atmosphere furnace comprising a radiation pyrometer including a radiation-transparent window for receiving along a radiation path radiant energy emitted from said body, said pyrometer having hermetically sealed therein a gaseous filtering medium having substantially the same radiation-absorbing characteristics as the atmosphere surrounding said heated body within the furnace, a support for mounting said pyrometer, and means for circulating cooled atmosphere derived from the exhaust gases from said furnace around said radiation pyrometer for preventing the deposition of soot on the window of said radiation pyrometer, said cooled atmosphere having substantially the same radiation-absorbing characteristics as the atmosphere surrounding said body and in the radiation path between said body and said radiation pyrometer in avoidance of varying radiation-absorbing characteristics in said radiation path which would introduce errors in temperature measurements.

14. An apparatus for measuring the temperature of a heated body within the enclosure of a controlled atmosphere furnace comprising a radiation-responsive detector, means for supporting said detector to receive radiation emitted by said body, filtering means comprising a gaseous medium having similar radiation absorption characteristics as the atmosphere within said furnace, and means for varying the temperature of the gaseous medium within said filtering means upon variation in temperature of said body to maintain the radiation-absorption characteristics of said gaseous medium substantially similar to the radiation-absorption characteristics of the atmosphere within said furnace.

15. An apparatus for measuring the temperature of a heated body surrounded by a selectively absorbing atmosphere comprising a radiation-responsive detector, means for supporting said detector to receive radiation emitted from said body, and a plurality of radiation-transparent filter cells interposed in the optical path between said body and said detector, each of said cells containing at least one of the constituents comprising said selectively absorbing atmosphere.

16. A system for reducing errors in temperature measurement caused by absorption of thermal radiation in gases and vapors existing in the atmospheric path between a radiation-responsive detector and the body whose temperature is to be measured comprising a controlled atmosphere furnace adapted for receiving therein a carburizing atmosphere, a radiation-responsive detector, supporting means for mounting said detector, said supporting means comprising an open-end tube extending into an opening in said furnace and adapted for alignment with the body whose temperature is to be measured, and filtering means interposed in the optical path between said detector and said opening in said furnace, said filtering means comprising a gas having radiation absorption characteristics corresponding to the radiation absorption characteristics of the carburizing atmosphere of said furnace.

17. A system for reducing errors in temperature measurement caused by absorption of thermal radiation in gases and vapors existing in the atmospheric path between a radiation-responsive detector and the body whose temperature is to be measured, comprising a controlled atmosphere furnace adapted for receiving therein a carburizing atmosphere, a radiation-responsive detector, supporting means for mounting said detector, said supporting means comprising an open-end tube extending into an opening in said furnace and adapted for alignment with the body whose temperature is to be measured, filtering means interposed in the optical path between said detector and said opening in said furnace, said filtering means comprising a gaseous medium disposed within a chamber having at least one radiation-transparent window, said medium having radiation absorption characteristics corresponding to the radiation absorption characteristics of the carburizing atmosphere of said furnace, means for conditioning exhaust atmosphere from said furnace, and means for circulating the conditioned atmosphere through said supporting tube for preventing deposition of soot on said window of said filter chamber in avoidance of varying the constituents of the carburizing atmosphere within the furnace and the radiation-absorption characteristics of the atmosphere in said optical path between said detector and said body.

18. An apparatus for measuring the temperature of a heated body surrounded by a selectively absorbing atmosphere comprising a radiation pyrometer having sealed therein a filter gas corresponding to one of the constituents of said absorbing atmosphere, and a radiation-transparent chamber containing a filter gas corresponding to another of the constituents of said absorbing atmosphere, said chamber being adapted to be interposed in the optical path between said radiation pyrometer and the body whose temperature is to be measured.

19. An apparatus for measuring the temperature of a body within the enclosure of a carburizing furnace comprising a radiation-responsive detector for receiving radiation from said body through an opening in said furnace, a radiation-transparent filter cell containing methane, and means for supporting said filter cell in the optical path between said radiation-responsive detector and the body whose temperature is to be measured.

20. A radiation pyrometer for measuring the temperature of a heated body within the enclosure of a controlled atmosphere comprising a housing, a radiant energy sensitive element within said housing, means to permit passage of radiant energy into said housing, means supported by said housing to concentrate radiant energy admitted to said housing upon said sensitive element, and a gaseous filtering medium having substantially the same radiation-absorbing characteristics as said controlled atmosphere surrounding said heated body hermetically sealed within said housing.

21. An apparatus for measuring the temperature of a heated body surrounded by a variably absorbing atmosphere comprising a radiation-responsive detector for receiving radiation emitted by said body, and a sealed radiation-transparent filter chamber in the path of radiation to said detector and containing an atmosphere having radiation-absorption characteristics substantially the same as the atmosphere surrounding said body whose temperature is to be measured.

22. A device for use with a radiation-responsive detector to measure the temperature of a body surrounded by an atmosphere which selectively absorbs and emits radiant energy comprising a radiation-transparent filter cell for interposition in the optical path between the radiation-responsive detector and the body and containing a gaseous medium having radiation absorption characteristics substantially the same as those of the atmosphere surrounding the body whose temperature is to be measured.

References Cited in the file of this patent

UNITED STATES PATENTS

| Number | Name | Date |
| --- | --- | --- |
| 2,122,941 | Hufler et al. | July 5, 1938 |
| 2,366,285 | Percy et al. | Jan. 2, 1945 |
| 2,372,661 | Dawson | Apr. 3, 1945 |
| 2,395,937 | Paalu | Mar. 5, 1946 |
| 2,421,224 | Solakian et al. | May 27, 1947 |
| 2,448,199 | Vollrath | Aug. 31, 1948 |
| 2,528,626 | Wannamaker, Jr., et al. | Nov. 7, 1950 |
| 2,562,864 | Jury et al. | July 31, 1951 |

FOREIGN PATENTS

| Number | Country | Date |
| --- | --- | --- |
| 883,748 | France | Mar. 29, 1943 |
| 892,395 | France | Jan. 7, 1944 |
| 950,577 | France | Mar. 28, 1949 |